US012444862B2

(12) United States Patent
Ellis et al.

(10) Patent No.: US 12,444,862 B2
(45) Date of Patent: Oct. 14, 2025

(54) ELECTRICAL CONNECTION ELEMENT FOR A FORM-FITTED OR WELDING ATTACHMENT TO A SHEET METAL PART

(71) Applicant: PROFIL Verbindungstechnik GmbH & Co. KG, Friedrichsdorf (DE)

(72) Inventors: Adrian Ellis, Essex (GB); Richard Humpert, Bad Nauheim (DE)

(73) Assignee: PROFIL Verbindungstechnik GmbH & Co. KG, Friedrichsdorf (DE)

(*) Notice: Subject to any disclaimer, the term of this patent is extended or adjusted under 35 U.S.C. 154(b) by 1024 days.

(21) Appl. No.: 17/510,839

(22) Filed: Oct. 26, 2021

(65) Prior Publication Data

US 2022/0131284 A1 Apr. 28, 2022

(30) Foreign Application Priority Data

Oct. 28, 2020 (DE) ........................ 102020128341.5

(51) Int. Cl.

| | |
|---|---|
| ***H01R 4/64*** | (2006.01) |
| ***H01R 4/30*** | (2006.01) |
| ***H01R 13/629*** | (2006.01) |
| ***H01R 43/16*** | (2006.01) |
| *H01R 4/06* | (2006.01) |

(52) U.S. Cl.

CPC ............... *H01R 4/64* (2013.01); *H01R 4/305* (2013.01); *H01R 13/629* (2013.01); *H01R 43/16* (2013.01); *H01R 4/06* (2013.01)

(58) Field of Classification Search

CPC ........ H01R 4/64; H01R 4/305; H01R 13/629; H01R 43/16; H01R 4/06; H01R 13/04; H01R 11/28; H01R 13/03; H01R 2101/00; H01R 2201/26

See application file for complete search history.

(56) References Cited

U.S. PATENT DOCUMENTS

| | | | | |
|---|---|---|---|---|
| 5,528,812 A * | 6/1996 | Muller | .................. | F16B 37/062 29/520 |
| 2017/0244187 A1* | 8/2017 | Ostermann | ........... | H01R 13/111 |

FOREIGN PATENT DOCUMENTS

| | | | | | |
|---|---|---|---|---|---|
| CN | 103503197 | A | * | 1/2014 | ........ H01M 10/0525 |
| CN | 204680816 | U | | 9/2015 | |
| CN | 208078201 | U | * | 11/2018 | ............. H01R 4/183 |
| DE | 19908031 | A1 | | 9/2000 | |
| DE | 102007055040 | A1 | | 5/2009 | |
| DE | 102014119044 | A1 | | 6/2016 | |
| DE | 102018202955 | A1 | | 8/2019 | |
| DE | 102018009510 | A1 | | 6/2020 | |
| EP | 1497073 | B1 | | 10/2008 | |
| EP | 1540770 | B1 | | 5/2012 | |
| EP | 2549128 | A1 | | 1/2013 | |
| EP | 3035448 | A1 | | 6/2016 | |

* cited by examiner

*Primary Examiner* — Travis S Chambers

(74) *Attorney, Agent, or Firm* — Gregory J. Gore, Esq.

(57) ABSTRACT

An electrical connection element for a form-fitted or welding attachment to a sheet metal part and for receiving a cable connection device is characterized by a metallic ring that surrounds a contact region and that closely contacts the contact region by means of a permanent ring stress produced in the ring. The ring has an outer surface that forms a contact surface for the cable connection device.

19 Claims, 5 Drawing Sheets

Figure 1B:
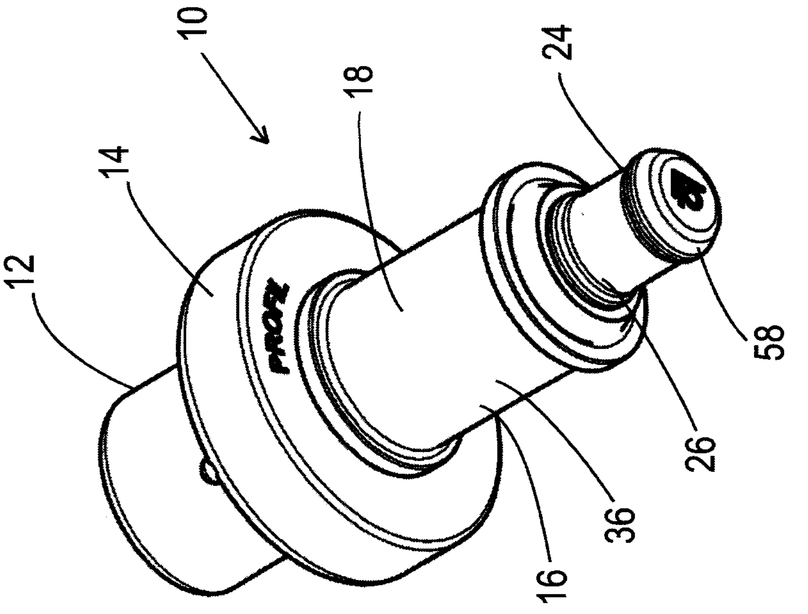

ELECTRICAL CONNECTION ELEMENT FOR A FORM-FITTED OR WELDING ATTACHMENT TO A SHEET METAL PART

The present invention relates to an electrical connection element for a form-fitted or welding attachment to a sheet metal part and for receiving a cable connection device.

Such connection elements are used in many cases, above all in automotive construction and in the manufacture of household appliances, to produce a grounded connection to the car body or to a sheet metal housing. They are often designated as ground bolts or ground nuts, even if they are also used as current-conducting connections to sheet metal parts that are themselves not grounded, but are insulated from ground. The designations ground bolt and ground nut come about because these connection elements have threads, whereby a cable eye, a type of cable connection device, is clamped to a contact surface of a ground bolt or ground nut by means of a nut or a bolt. Examples of ground bolts and ground nuts can be seen from EP-1497073B1 or EP-154077061. These connection elements, which are known per se, are connected to a sheet metal part by a mechanical joining, wherein the shaping work results in metallic bright surfaces between the connection element and the sheet metal part and therefore in a high-quality current transition. Further connection elements having threads are furthermore known in the form of welding elements that are attached to a sheet metal part by means of electric butt welding.

Connection elements having threads indeed work well, but the necessity of fastening cable connection devices by means of a nut or a bolt is found to be problematic in some respects. On the one hand, the connection between the connection element and the sheet metal part has to be sufficiently rotationally fixed such that the screwing and unscrewing of the nut or the bolt does not result in a loosening of the connection between the connection element and the sheet metal part and the alignment of the cable clamp and therefore the course of the feed line can be problematic if no measures are taken to avoid a rotation of the cable eye relative to the connection element. However, this also brings about problems since a precise angular alignment of the connection element relative to the sheet metal part is ultimately required and this represents an additional complication on the attachment of the connection element. In the case of the connection elements designed as ground bolts or ground nuts and in general in the case of connection elements, an attempt is made to keep the number of boundary surfaces over which the current flows as small as possible since each boundary surface, i.e. each transition between two different components, is potentially subject to resistance losses and contamination problems. For example, ground bolts or ground nuts are provided with a flange, which is an integral component of the ground bolt or the ground nut, and the cable eye is pressed directly against the flange, whereby only two boundary surfaces or current transitions are present, and indeed between the cable eye and the flange of the connection element and between the connection element and the sheet metal part. Furthermore, particular measures are taken to keep the flange free of contamination before the attachment of the cable eye. This is in particular important for painted or oiled parts since it would be desired to keep paint or oil away from the connection surface of the flange. This can, for example, take place by means of a disposable protective cap or, even better, by the nut or the bolt that is used to press the cable eye against the flange. On the painting of the sheet metal part, the nut or the bolt then protects the connection surface from a paint application and only needs to be released or loosened to mount the cable eye between the nut and the ground bolt or between the bolt and the ground nut.

Recently, elements having threads have been abandoned and plug-on elements, onto which particular cable connection devices are easily plugged, are used instead. An example of such a cable connection device, which can be plugged on and which has a spring cage, is equipped with an egg timer-shaped cage whose central constriction forms the actual contact region to the connection element and establishes the electrical contact at an annular contact surface of the connection element. An example of a cable connection device having a spring cage (called a contact sleeve there) can be found in EP-3035448A. Other cable connection devices that can be plugged on are also conceivable, for example, in the manner of spark plug connectors.

Achieving a sufficient electrical contact between the plug connector, for example its spring cage, and the contact region of the connection element, which electrical contact is maintained over a long period and is susceptible as little as possible to corrosion or oxidation, is problematic with connection elements for receiving cable connection devices in the form of plug connectors.

To satisfy this object, provision is made in accordance with the invention that a metallic ring surrounds the contact region, closely contacts the contact region by means of a permanent stress produced in the ring, and has an outer surface that forms a contact surface for the cable connection device.

This satisfaction is surprising since, due to the insertion of the ring, a further boundary surface or a further current transition is present, namely from the plug connector to the ring and from the ring to the contact region of the connection element, that would normally be equivalent to an unwanted contact resistance, especially since the surface of the contact region of the connection element is normally provided with an oil film, may possibly be partly oxidized, or may even be provided with a passivated metallic coating or a galvanic layer for corrosion protection.

What is particularly surprising is that, due to the permanent stresses provided in the ring, irregularities of the inner surface of the ring are pressed so intensely against the surface of the contact region that they apparently penetrate the oil film, the oxide layer or the passivation and provide a high-quality transition from the ring into the connection element such that the additional boundary surface has no negative consequences. It is even favorable in accordance with the invention that the connection element has a metallic passivated coating at least in the contact region of the cable connection device since the inherently insulating passivation and the coating provide an overall corrosion-resistant connection element.

The following ideas are also relevant for the ground bolt in accordance with the invention. Since the ground bolt is not only used in the interior of the vehicle, but in particular also in the outer region, it must be ensured that there is a high level of corrosion protection. This is generally ensured by a zinc or zinc-nickel surface having an additional passivation and, if necessary, an additional sealing. However, corrosion protection always means that an attempt is made to stop the electron flow as far as possible. Naturally, this is counterproductive for a ground bolt in which a high conductivity is actually desired. On the other hand, the contact resistance becomes considerably better, the higher the surface pressure between the two partners is. It is therefore possible to compensate the disadvantages of a corrosion protection surface through a higher surface pressure.

Since the contact surface of the ring can be sealed from the outside world by a suitable connection device, for example a cup-shaped cable lug, no corrosion protection is then required here and a surface can be applied that provides a good contact capability. This is all the more necessary as only a low surface pressure can be applied via the springs of the cable lug. By using the ring, a low contact resistance, a high corrosion resistance, and low spring forces can therefore equally be achieved.

In the connection element in accordance with the invention, the ring can be shrunk onto the contact region by heating the ring and/or by cooling the connection element or can be attached by a mechanical squeezing. On the heating of the ring and/or by cooling the connection element and then cooling or heating it to an environmental temperature, a permanent tensile stress is produced in the ring, i.e. a type of ring stress that provides the intensive engaging into one another or contact of the inner surface of the ring and the outer surface of the contact region of the connection element.

If, in contrast, the ring is pressed onto the contact region by a mechanical squeezing, which can take place by a radial and/or axial force introduction, a permanent compressive stress is achieved in the ring and likewise provides the intensive engaging into one another of the inner surface of the ring and the outer surface of the contact region of the connection element.

A particular variant of the mechanical squeezing comprises designing the ring in the manner of a cutting ring and applying it to the contact region, in a similar manner to the application of a cutting ring to a hydraulic line, apart from the fact that the tool used for this purpose is removed again there after the application of the cutting ring. For this purpose, a conical slanted surface at the connection element and a sleeve-like tool having an inner slanted surface can be used, wherein the ring or the cutting ring is radially and axially pressed between the mutually facing conical slanted surfaces in a suitable pressing device.

Due to the cutting effect of a cutting ring, a permanent compressive stress is likewise produced in the ring or in the cutting ring and an intensive engaging into one another of the inner surface of the ring and the outer surface of the contact region of the connection element is also produced. In a cutting ring, a cutting effect of the inner edges at the end faces of the cutting ring into the surface of the contact region is, however, also produced, whereby an excellent current transition is likewise made possible.

It is particularly favorable if the ring is composed of copper, of a copper alloy, or of another metal having a good conductivity. Such a design also improves the current transition from the plug connector into the ring and from the ring into the connection element.

On the use of a copper ring or similar, it has proved to be favorable to heat said copper ring to 200° C. and to shrink it onto the cylindrical contact region of the connection element and indeed such that, after the heating, the inner diameter of the ring corresponds to the outer diameter of the contact region at an environmental temperature, i.e. at approximately 20° C. It can also be seen from this that a cooling of the connection element to minus 180° C. (the temperature of liquid nitrogen) and a subsequent heating to 20° C. causes a similar thermal growth of the connection element to the shrinkage that occurs on the heating of the ring to 200° C. and the subsequent cooling to 20° C.

It is particularly preferred if the ring is coated at least in the region of the contact region and preferably also in the region of the outer surface and even better over the full area with a material that conducts even better than the ring itself. It is even more preferred if the material of the coating is relatively soft compared to the body of the connection element. For example, the material of the coating can be composed of silver, a silver alloy, gold, a gold alloy, or another corrosion-resistant material having a good conductivity.

Due to the coating at the outer contact surface of the ring, an electrically high-quality transition can be provided between the cable connection device and the ring. An even better current transition between the ring and the body of the connection element is also provided by the full-area coating of the ring. If the ring is coated over the full area, it may even be the case that the current flows mainly over the coating into the body of the connection element, whereby the electrical conductivity of the ring plays a subordinate role and said ring can therefore be produced from a less expensive material than pure copper.

The connection element in accordance with the invention can be a ground bolt or a ground nut. However, this is not absolutely necessary since the connection element can also be used with a sheet metal part that is being or is electrically insulated with respect to a grounded metallic housing or sheet metal part.

The connection element in accordance with the invention is preferably provided for use with a cable connection device—possibly known per se—that has a spring cage that provides an electrical contact with the outer surface of the ring and that surrounds the outer surface.

Due to the practical use of the connection element in accordance with the invention, a component assembly is produced in which the connection element is welded to the sheet metal part or is attached thereto in a form-fitted manner by a shaping process.

The present invention further comprises a method of producing an electrical contact with a contact region of a connection element, in particular an element in accordance with any one of the embodiments described above, with the particular feature that a ring composed of metal is heated, is applied to the contact region, and is then shrunk onto the contact region. A permanent tensile stress is hereby produced in the ring, maintains a high-quality current transition over a longer time, and protects the boundary surface between the ring and the body of the connection element against oxidation or moisture.

It is also conceivable as an alternative or in addition to the method explained directly above that the connection element having the contact region is cooled, for example with liquid nitrogen, and a ring composed of metal is applied to the contact region and the connection element with the ring is brought to an environmental temperature. A permanent tensile stress is also present in the ring in this case, with the same advantages as explained above.

As a further alternative, the ring composed of metal can be pressed on the contact region. In this respect, the method can take place such that the ring composed of metal is axially applied to the contact region and is pressed radially inwardly. A permanent compressive stress is hereby produced in the ring and likewise maintains a high-quality current transition over a longer time and protects the boundary surface between the ring and the body of the connection element against oxidation or moisture.

Furthermore, a ring composed of metal can be used that is designed in the manner of a cutting ring and that is applied to the contact region by an axial and or radial pressing. A permanent compressive stress is also produced in the ring in this case and likewise maintains a high-quality current transition over a longer time and protects the boundary surface between the ring and the body of the connection element (at least in the region of the end faces of the ring) against oxidation or moisture.

Figure 1A:
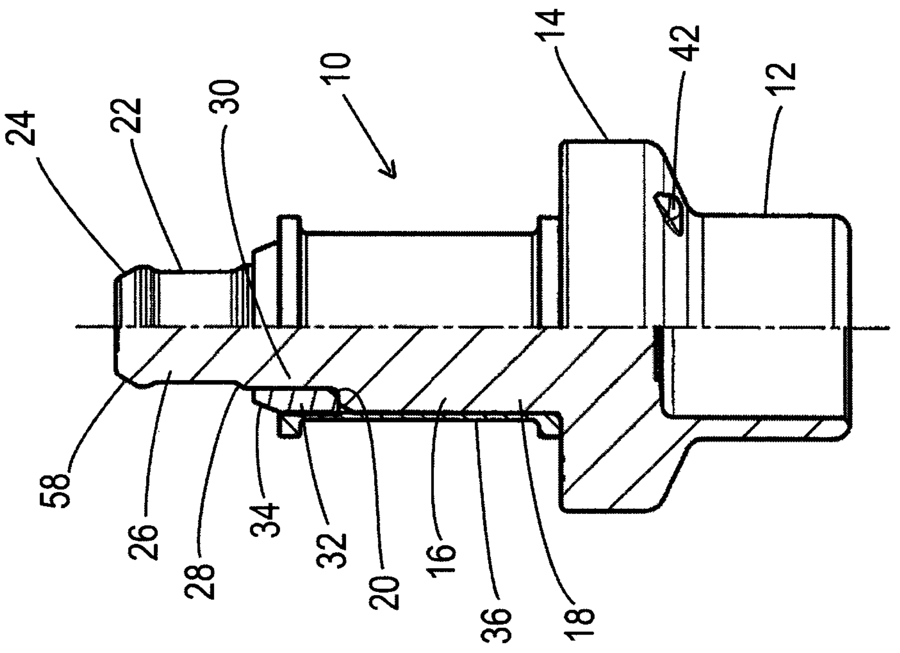
Figure 1C:
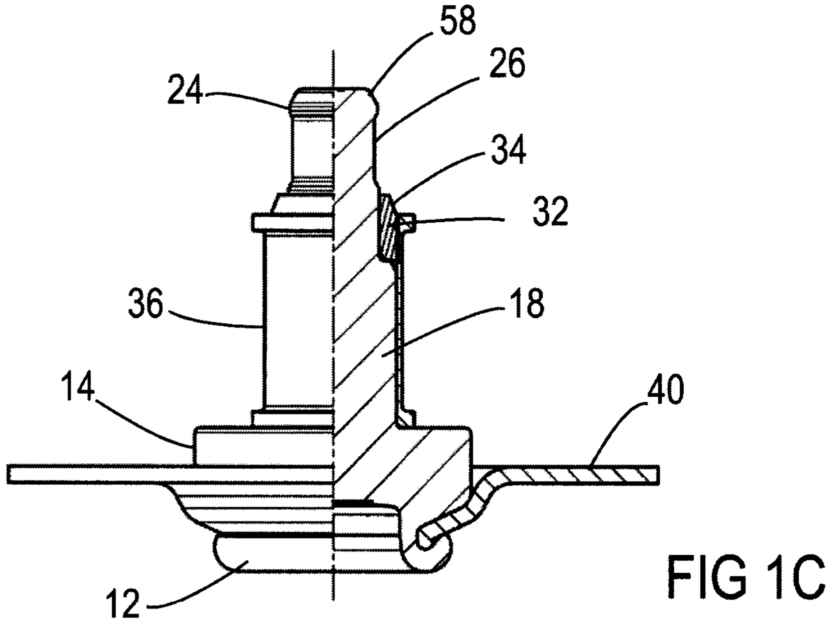
Figure 1D:
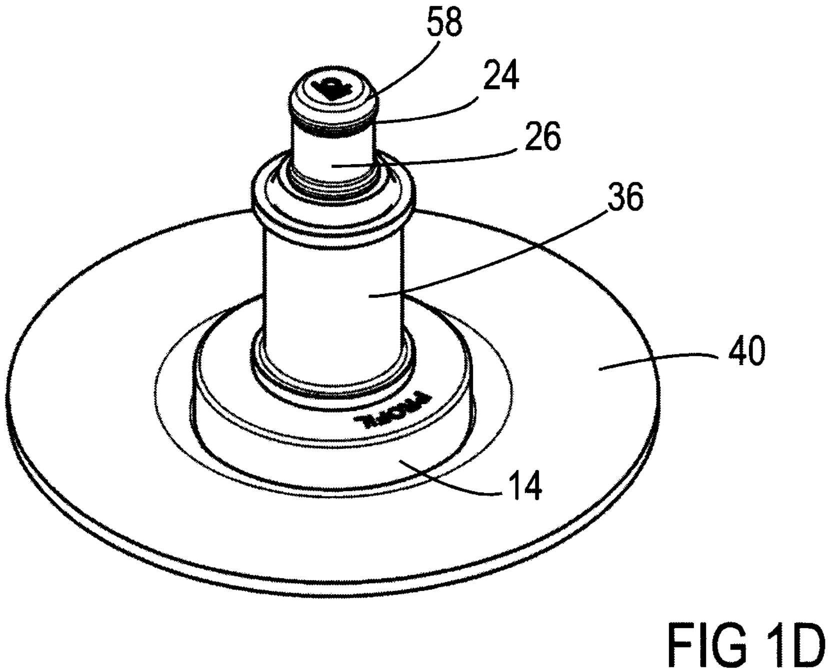
Figure 2A:
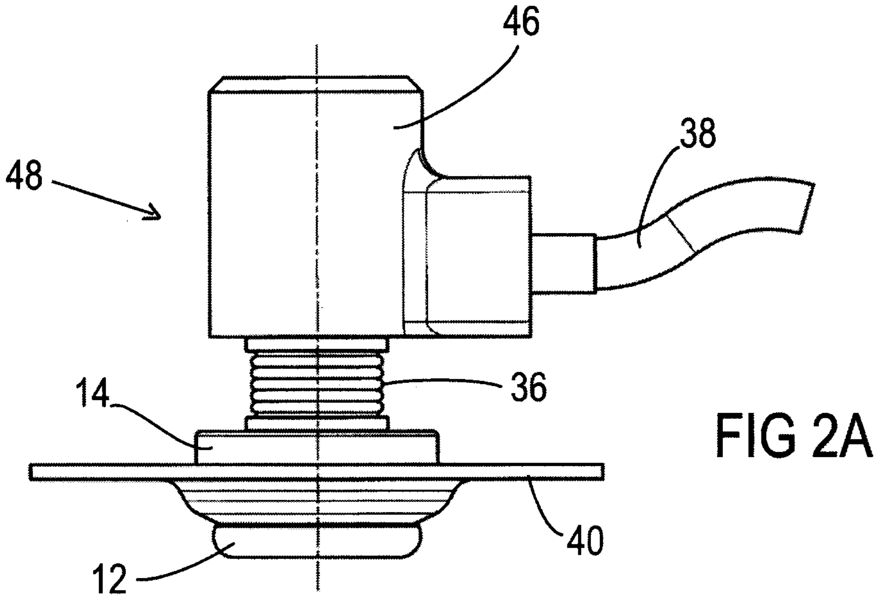
Figure 2B:
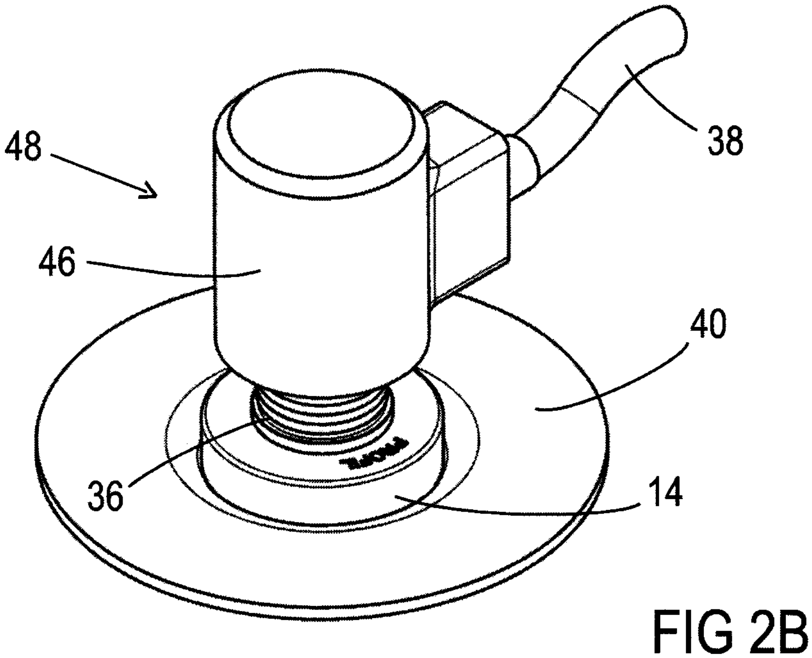
Figure 3:
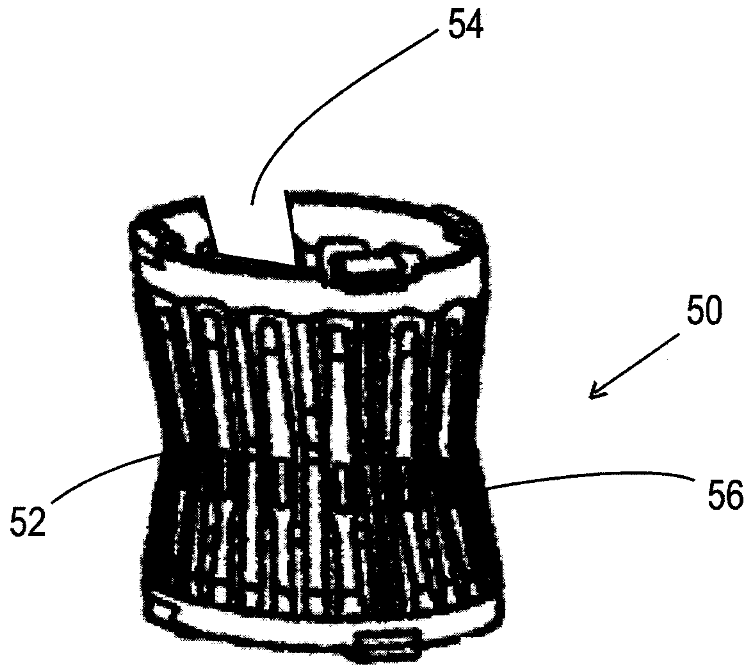
Figure 4A:
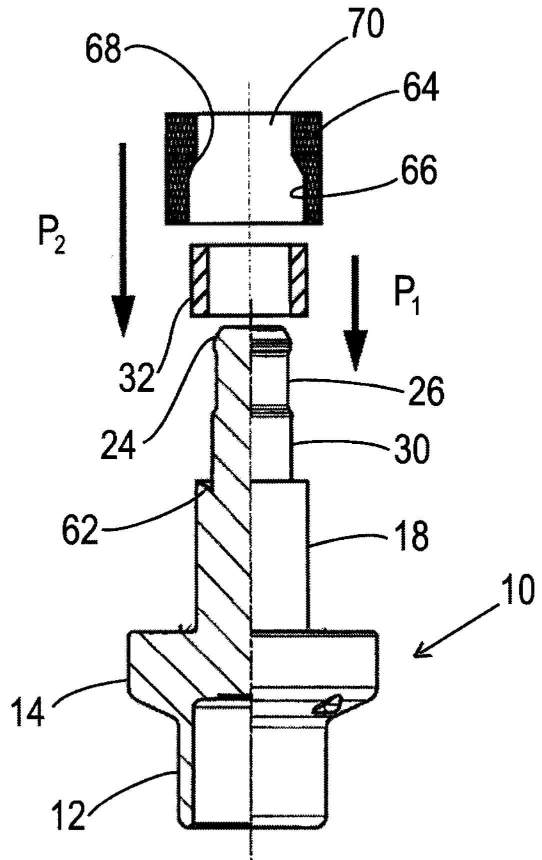
Figure 4B:
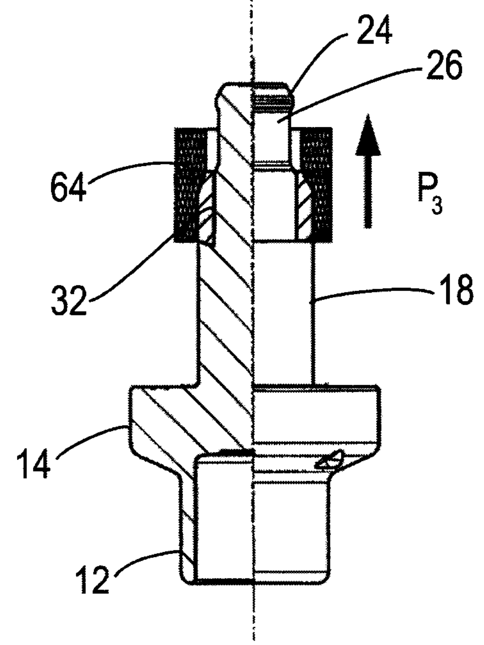

The invention will be explained in more detail in the following with reference to embodiment examples and to the drawing in which is shown:

FIGS. 1A and 1B an axially sectioned representation and a perspective representation of an electrical connection element in accordance with the invention for a form-fitted attachment to a sheet metal part;

FIGS. 1C and 1D an axially sectioned representation and a perspective representation of the electrical connection element in accordance with the invention in accordance with FIGS. 1A and 1B after the form-fitted attachment to a sheet metal part;

FIGS. 2A and 2B a side view and a perspective representation of the connection element in accordance with FIGS. 1C and 1D after the attachment of a cable connection device;

FIG. 3 a perspective representation of a spring cage that can be used within the cap of the cable connection device in accordance with FIGS. 2A and 2B; and FIGS. 4A and 4B a perspective and axially sectioned representation of a tool device for attaching a cutting ring-like ring to the shaft part of a connection element similar to FIGS. 1A and 1B.

Referring to FIGS. 1A and 1B, an electrical connection element 10 can be seen there that has a cylindrical rivet section 12 at the lower side of the head part 14 for a form-fitted attachment to a sheet metal part. This will be explained later in connection with FIGS. 1C and 1D. The electrical connection element is configured to receive a cable connection device that will be explained later in connection with FIGS. 2A and 2B and 3.

In addition to the head part 14 comprising the rivet section 12, the connection element 10 has a shaft part 16 comprising a region 18 that is adjacent to the head part and that ends in a ring shoulder 20. Above the ring shoulder 20, the shaft part 16 has an extension 22 having a shape that approximately corresponds to a conventional spark plug connector in the present example, and indeed having an upper collar 24 and therebeneath a cylindrical section 26 of a smaller diameter that merges via an oblique ring shoulder 28 into a cylindrical region 30. The cylindrical region 30 is larger in diameter than the cylindrical section 26, but smaller than the region 18 adjacent to the head part, i.e. the ring shoulder 20 is located between the region 18 and the region 30. The cylindrical region 30 is surrounded by a metallic ring 32 that surrounds the contact region of the body of the metallic connection element 10 and that, by means of a permanent ring stress produced in the ring, closely contacts the cylindrical region 30 that forms the contact region between the ring 32 and the connection element 10. The ring 32 has an outer surface 34 that forms a contact surface for a cable connection device 48 (FIGS. 2A and 2B).

In the representation in accordance with FIGS. 1A to 1D, the ring 32 and the region 18 of the shaft part 16 are surrounded by a comparatively soft protective cover 36 that is pushed downwardly from the outer surface of the ring 32 on the attachment of the cable connection device, whereby an electrical contact between the cable connection device (FIGS. 2A and 2B or FIG. 3) and the outer surface of the ring 32 is made possible. The purpose of the protective cover 36 is, on the one hand, to keep the outer surface of the ring free of paint during the painting of the sheet metal part with the connection element 10 attached or to keep the outer surface of the ring free of other contamination, but to release this outer surface when the plug-type cable connection device is plugged onto it.

Even though it is not recognizable from FIGS. 1A to 1D, the body of the metallic connection element, which is typically, but not necessarily, composed of steel, is provided with a metallic passivated coating that is present at least in the contact region of the cable connection device. Since this coating is very thin, the line that defines the shape of the body can be considered as the passivated metallic coating. The coating is composed of nickel or a nickel alloy, for example.

The coating protects the body of the connection element against corrosion and is frequently also covered with a thin film of grease, and indeed in addition to the coating or the passivated coating. Both a thin film of grease and any passivation tend to be considered as insulating.

Nevertheless, probably due to the ring stress, it is surprisingly possible to produce a good electrical contact between the ring and the shaft part 16 of the connection element.

The ring stress can be produced in that the ring 32 is shrunk onto the contact region 30 by heating the ring 32 and/or by cooling the connection element 10 or is attached to said contact region by a mechanical squeezing.

The ring 32 is preferably composed of copper, of a copper alloy, or of another metal having a good conductivity and is coated at least in the region of the outer surface of the ring 32, preferably also in the contact region between the radially inner surface of the ring 32 and the region 30 of the shaft part 16 and—even better—over the full area with a material that conducts even better than the ring itself.

The material of the coating is preferably relatively soft compared to the body of the connection element. A good electrical contact with the shaft part 16 of the connection element and with the cable connection device is hereby facilitated.

The material of the coating is preferably composed of silver, a silver alloy, gold, a gold alloy, or another corrosion-resistant material having a good conductivity.

The embodiment shown relates to a ground bolt. The design as a ground nut is likewise conceivable; a hollow variant of the bolt in accordance with the Figures shown here would then be used.

Referring to FIGS. 1C and 1D, it is shown how the ground bolt in accordance with FIGS. 1A to 1D is carried out on a sheet metal part 40 by means of rivets. The rivet section 12 is self-piercingly pressed into the sheet metal part shown here as a disk. The riveting can take place as it is best known for an SBF bolt of the applicant and therefore does not have to be explained here. It is only intended to be expressed that fresh contact material, i.e. an oxide-free transition between the head part 14 of the metallic bolt element 10 and the sheet metal part 40, is produced by the self-piercing attachment. This is further facilitated by the fact that the security against rotation noses 38 of the head part are likewise pressed into the sheet material.

Instead of implementing the connection element as an element mechanically joined to the sheet metal part 40, it could also be implemented as a welding element. For this purpose, the head part could, instead of a rivet section, have three or another number of welding tips that are very well known per se and that form the initial contact with the sheet metal part 40 during the welding process, as is typical for welding elements.

FIGS. 2A and 2B show the component assembly 44 that is produced when a cable connection device 48 having a cap 46 is pressed, similarly to a spark plug connector, onto the shaft part 16 of the ground bolt 10. The slanted surface 58 at the upper side of the collar 24 facilitates the attachment of the cap 46 that can be plugged on and shape features within the cap 46 (not shown here) fixedly hold the cap at the cylinder region 26 beneath the collar 24. The upper slanted surface 58 of the collar 24 facilitates the plug-on movement and spreads the clamping device (not shown) that is provided within the cap, that surrounds the cylindrical region 26 in a clamping manner after the plug-on movement, and that secures the cap 46 or the cable connection device against an unintentional release from the connection element.

A slit spring cage 50, which is shown on its own in FIG. 3 and whose central constriction 52 forms the contact region to the outer surface 34 of the ring 32 or its coating, is preferably located within the plug-like cable connection device 48. The spring cage 50 is seated firmly spread within the cap 46. The continuous longitudinal slot 54 and the resilient contact tongues 56 ensure that the required contact pressure is established at the outer surface 34 of the ring 32.

On the plug-on movement of the cable connection device 48, the protective cover 36 is pressed downwardly from the outer surface of the ring 32 and adopts the bellows-like folded shape shown in FIGS. 2A and 2B. In this downwardly pressed folded shape, the protective cover 36, which can be partly received in a cylindrical receiver (not shown) of the cap 46 beneath the spring cage 50, forms a seal that prevents contamination from entering the region of the spring cage 50 and of the outer surface 34 of the ring 32 and impairing the electrical function. It is not absolutely necessary to use a protective cover 36 that can be compressed into a bellows; instead, an elastic ring (not shown) could be used that takes over both the protective function during the painting and the sealing function after the assembly of the cable connection device 48. In another respect, FIGS. 2A and 2B show a cable 38 that is electrically connected to the connection element 10 and the sheet metal part 40 by means of the cable connection device and the spring cage. The cable 38 can be a multi-core cable (not shown).

As expressed above, the ring 32 composed of metal can be heated to approximately 200° C. and can be shrunk onto the region 30 of the shaft part 16 at a room temperature of approximately 20°. It is assumed in this respect that the inner diameter of the ring 30 is dimensioned such that a sliding fit on the outer diameter of the cylindrical region 30 is approximately produced at this temperature (approximately 200° C.). On the subsequent cooling to room temperature, the ring 32 shrinks by an amount that is sufficient to achieve a forceful pressing of the ring 32 onto the region 30, i.e. a sufficient ring stress in the ring 32.

An alternative possibility of attaching the ring 32 to the contact region 30 of the bolt comprises pressing the ring composed of metal on the contact region. This can take place using the apparatus in accordance with FIGS. 4A and 4B.

This is particularly favorable if the ring 32 is designed in the manner of a cutting ring, as shown here. However, the press-on process that is now described can also take place with designs of the ring 32 that are not to be understood as cutting ring designs.

In this case, the ring 32 is applied to the contact region 30 by an axial and radial pressing. For this purpose, as shown in FIGS. 4A and 4B, a connection element 10 in the form of a male pin-like element is used that is very similar to the connection element in accordance with FIGS. 1A to 1B, and indeed except for the transition from the cylindrical contact region 30 into the extended cylindrical region 18. Said cylindrical region 18 is formed here as an annular groove whose outer flank forms a conical surface 62 that diverges downwardly in the direction of the central longitudinal axis. The protective cover in accordance with FIGS. 1A and 1B is also missing here since it is preferably only assembled after the assembly of the ring 32. Even though a male element is described here, this design could easily be applied to a female element such as a ground nut.

The arrow P1 in FIG. 4A indicates that the ring 32 is pressed onto the cylindrical region 30 by a downward movement in the longitudinal direction of the connection element. In this respect, the ring 32 is dimensioned in comparison with the diameter of the cylindrical region 30 such that a sliding fit is present. Above the ring 32, a cylindrical molding tool 64 is shown that is likewise moved downwardly in the longitudinal direction of the connection element in accordance with the arrow direction P2. The molding tool 64 has an inner cylindrical reception region 66 that receives the ring. This cylindrical region 66 merges via an upwardly converging conical surface 68 into a central passage 70 of the molding tool 64 that is dimensioned such that it comfortably fits onto the upper region 24, 26 of the connection element 10.

Due to a downwardly directed movement of the molding tool 64 with respect to the connection element 10, which may take place in a press or by means of pliers or motor-driven pliers or by means of a robot, the ring 32 is axially squeezed between the conical surface 62 and the conical surface 68. Since the ring cannot expand radially outwardly, as this is prevented by the seat in the cylindrical region 66, it is pressed radially inwardly and in this way closely contacts the contact region 30 of the connection element 10, as shown in FIG. 4B. The ring therefore has conical regions at its two ends due to the deformation forces, which start from the conical surfaces 62 and 68, and a permanent compressive stress that ensures the engagement with the contact region 30. This means that the ring 32 is pressed both axially and radially.

It is also conceivable to arrange the ring with a slight interference fit in the cylindrical reception region 66 of the molding tool 64 and to use this not only for pressing the ring 32, but also for handling the ring. This means that the ring is first inserted into the molding tool 64 and transported with it and pressed onto the connection element. To ensure an easy release of the compressed ring from the molding tool, which is accomplished by an upward movement of the molding tool 64 in the arrow direction P3 away from the connection element 10 in FIG. 4B, it can be useful to design the cylindrical region 66 as slightly conical, in the representation in accordance with FIGS. 4A and 4B as diverging downwardly in a conical shape.

Whenever top and bottom are spoken of in this document or similar geometric designations are used, this is always only to be understood with respect to the drawings and not as a limitation of the scope of protection. In this embodiment, a permanent compressive stress is also produced in the ring, likewise maintains a high-quality current transition over a longer time, and protects the boundary surface between the ring and the body of the connection element against oxidation or moisture.

If the ring 32 is designed as a cutting ring, said ring 32, analogously to a cutting ring known per se in oil hydraulics, is pressed in a cutting manner into the surface of the contact region 30 at least in the region of the end faces of the ring, which also provides a high-quality current transition. Even though conical surfaces such as 62 and 68 are preferred, slightly convexly or concavely curved surfaces could also be used.

The material of the connection element can be composed of steel or aluminum or a suitable metal alloy, for example, of any common material for fastening elements that are mechanically joined to sheet metal parts or welded to sheet metal parts.

REFERENCE NUMERAL LIST

10 connection element
12 rivet section
14 head part
16 shaft part
18 region of the shaft part 16
20 ring shoulder
22 extension
24 collar
26 cylindrical section
28 ring shoulder
30 cylindrical region, contact region
32 ring
34 outer surface of the ring 32
36 protective cover
38 cable
40 sheet metal part
42 security against rotation noses of the head part 14
44 component assembly
46 cap
48 cable connection device
50 spring cage
52 constriction of the spring cage
54 continuous longitudinal slot
56 contact tongues
58 slanted surface
62 conical surface of the axial groove in the connection element
64 molding tool
66 cylindrical reception region of the molding tool
68 conical surface of the molding tool
70 central passage of the molding tool

The invention claimed is:

1. An electrical connection element for one of a form-fitted attachment and a welding attachment to a sheet metal part and for receiving a cable connection device, the electrical connection element comprising a metallic ring, the metallic ring surrounding a contact region, the metallic ring closely contacting the contact region by means of a permanent ring stress produced in the ring, and the metallic ring having an outer surface that forms a contact surface for the cable connection device.

2. The electrical connection element in accordance with claim 1, wherein the connection element has a metallically passivated coating at least in the region of the outer surface, said metallically passivated coating forming the contact region for the cable connection device.

3. The electrical connection element in accordance with claim 1, wherein the metallic ring is shrunk onto the contact region by at least one of heating the metallic ring and cooling the connection element.

4. The electrical connection element in accordance with claim 1, wherein metallic is attached by a mechanical squeezing.

5. The electrical connection element in accordance with claim 1, wherein the metallic ring is applied to the contact region in the manner of a cutting ring.

6. The electrical connection element in accordance with claim 1, wherein the metallic ring is composed of one of copper, a copper alloy, and another metal having a good conductivity.

7. The electrical connection element in accordance with claim 1, wherein the metallic ring is coated at least in the region of the contact region with a material that conducts even better than the metallic ring itself.

8. The electrical connection element in accordance with claim 7, wherein the metallic ring is coated at least in the region of the contact region and also in the region of the outer surface.

9. The electrical connection element in accordance with claim 8, wherein the metallic ring is coated over a full area of the metallic ring.

10. The electrical connection element in accordance with claim 7, wherein a material of the coating is relatively soft compared to the body of the connection element or to the ring.

11. The electrical connection element in accordance with claim 7, wherein a material of the coating is composed of one of silver, a silver alloy, gold, a gold alloy, and another corrosion-resistant material having a good conductivity.

12. The electrical connection element in accordance with claim 1, wherein it is one of a ground bolt and a ground nut.

13. The electrical connection element in accordance with claim 1, wherein the cable connection device has a spring cage that provides an electrical contact with the outer surface of the ring and that surrounds the outer surface.

14. A component assembly comprising an electrical connection element, the electrical connection element comprising a metallic ring, the metallic ring surrounding a contact region, the metallic ring closely contacting the contact region by means of a permanent ring stress produced in the ring, and the metallic ring having an outer surface that forms a contact surface for the cable connection device, wherein the connection element is welded to the sheet metal part or attached thereto in a form-fitted manner by a shaping process.

15. A method of producing an electrical contact with a contact region of an electrical connection element, the method comprising the steps of:

heating a ring composed of metal,
applying the ring to the contact region, and
then shrinking the ring onto the contact region.

16. The method according to claim 15, wherein the electrical connection element comprises a metallic ring, the metallic ring surrounding a contact region, the metallic ring closely contacting the contact region by means of a permanent ring stress produced in the ring, and the metallic ring having an outer surface that forms a contact surface for the cable connection device.

17. A method of producing an electrical contact with a contact region of a connection element, wherein the connection element having the contact region is cooled, and a ring composed of metal is applied to the contact region and the connection element with the ring is brought to an environmental temperature.

18. The method according to claim 17, the method further comprising the steps of:

heating a ring composed of metal,
applying the ring to the contact region, and
then shrinking the ring onto the contact region.

19. The method according to claim 17, wherein the connection element is cooled with liquid nitrogen.

* * * * *